(12) United States Patent
Most et al.

(10) Patent No.: US 11,648,740 B2
(45) Date of Patent: May 16, 2023

(54) IMPREGNATION MOULD HAVING NEEDLES FOR PRODUCING A PART FROM A WOVEN PREFORM

(71) Applicant: SAFRAN AIRCRAFT ENGINES, Paris (FR)

(72) Inventors: Vincent Bernard Serge Most, Le Plessis Robinson (FR); Nicolas Cambyse Ashtari, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 117 days.

(21) Appl. No.: 15/840,532

(22) Filed: Dec. 13, 2017

(65) Prior Publication Data
US 2018/0162076 A1 Jun. 14, 2018

(51) Int. Cl.
*B29C 70/54* (2006.01)
*B29C 70/48* (2006.01)
(Continued)

(52) U.S. Cl.
CPC ........ *B29C 70/548* (2013.01); *B29C 33/0066* (2013.01); *B29C 70/48* (2013.01); *B29C 70/546* (2013.01); *B29C 2045/0049* (2013.01); *B29C 2045/0089* (2013.01); *B29C 2045/205* (2013.01); *B29K 2105/0845* (2013.01); *B29K 2307/04* (2013.01); *B29L 2031/08* (2013.01)

(58) Field of Classification Search
CPC .............. B29C 33/0066; B29C 70/548; B29C 2045/14147; B29C 2045/161; B29C 70/48
See application file for complete search history.

(56) References Cited

U.S. PATENT DOCUMENTS 604,590 A * 5/1898 McColl ................. B29C 45/045
425/112
3,632,249 A * 1/1972 Pearson .................. B29C 33/04
425/526
(Continued)

FOREIGN PATENT DOCUMENTS

EP 0365579 5/1990
EP 0365579 A1 * 5/1990 ............. B29C 70/48
(Continued)

OTHER PUBLICATIONS

Machine translation JP2007062150A (Year: 2007).*
(Continued)

*Primary Examiner* — Matthew J Daniels
*Assistant Examiner* — Wayne K. Swier
(74) *Attorney, Agent, or Firm* — Womble Bond Dickinson (US)

(57) ABSTRACT

The invention relates to an impregnation mould for manufacturing a turbine engine part, made of composite material, obtained from a preform made of a weave of fibres, said mould having first and second portions provided with respective recesses that define a cavity capable of receiving the preform, in which at least one injection means of the mould allows a resin to be injected in order to impregnate said preform,
wherein said at least one injection means has a plurality of tubular injection needles, which are capable of extending from at least one of the first and second recesses to penetrate at least the weave of the preform in order to allow resin to be injected.

9 Claims, 7 Drawing Sheets

(51) Int. Cl.
    *B29C 33/00*     (2006.01)
    *B29K 105/08*     (2006.01)
    *B29K 307/04*     (2006.01)
    *B29L 31/08*     (2006.01)
    *B29C 45/00*     (2006.01)
    *B29C 45/20*     (2006.01)

(56) References Cited

U.S. PATENT DOCUMENTS

| | | | | | |
|---|---|---|---|---|---|
| 4,732,724 | A | * | 3/1988 | Sterner | B29C 45/27 264/328.8 |
| 2005/0184413 | A1 | * | 8/2005 | Forest | B29C 70/48 264/29.1 |
| 2017/0297235 | A1 | * | 10/2017 | Usui | B29C 39/10 |

FOREIGN PATENT DOCUMENTS

| | | | | |
|---|---|---|---|---|
| JP | 2007062150 A | * | 3/2007 | |
| WO | WO-9118725 | | 12/1991 | |
| WO | WO-9419176 | | 9/1994 | |
| WO | WO-2016136790 A1 | * | 9/2016 | B29B 11/16 |

OTHER PUBLICATIONS

Machine translation WO2016136790A1 (Year: 2016).*
M. K. Kang, W.I. Lee, and H. T. Hahn; Formation of microvoids during resin-transfer molding process from Composites Science and Technology 60 (2000) 2427-2423 from www.elsevier.com/locate/compscitech. (Year: 2000).*
French Search Report and Written Opinion with English Translation Cover Sheet, dated Aug. 24, 2017, French Application No. 1662431.

* cited by examiner

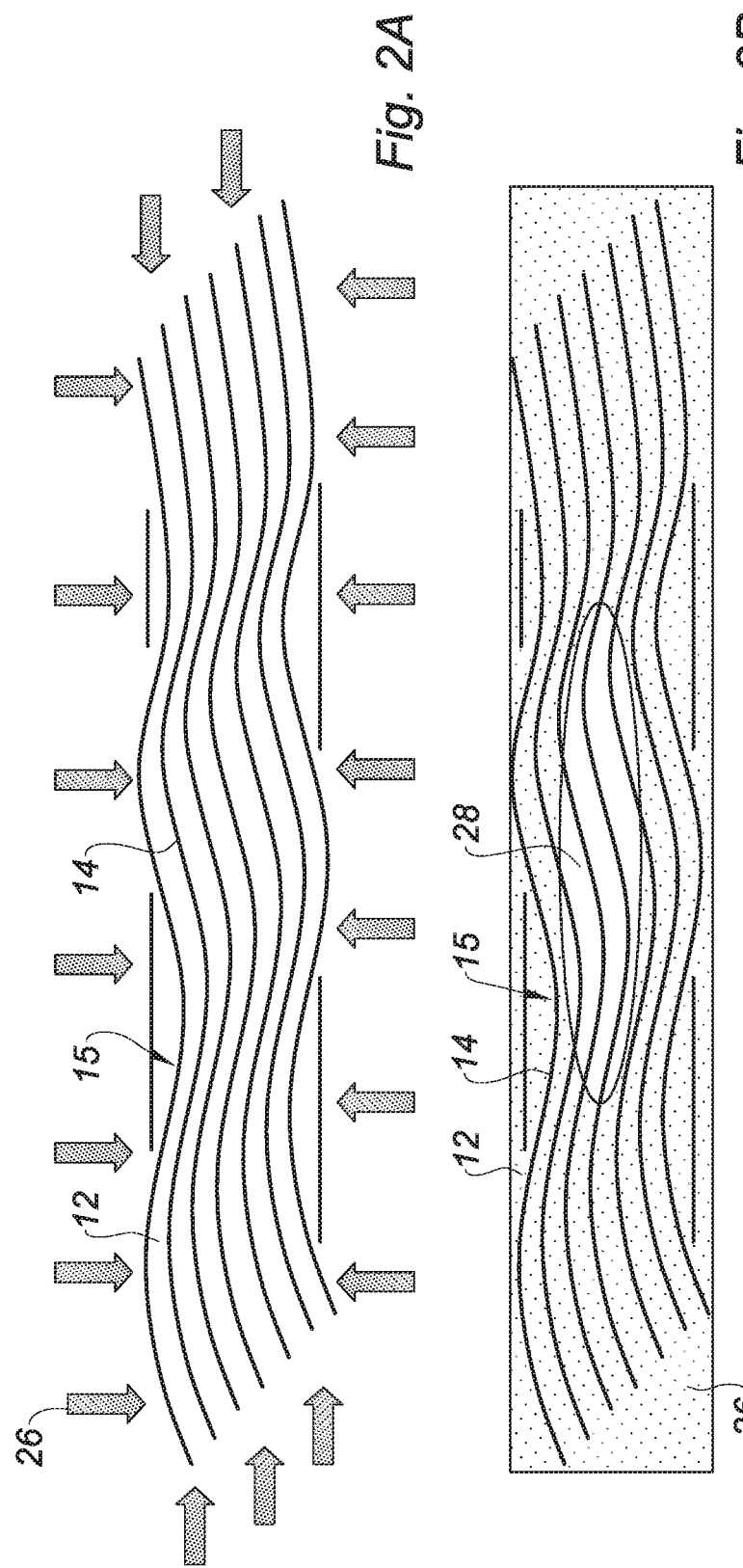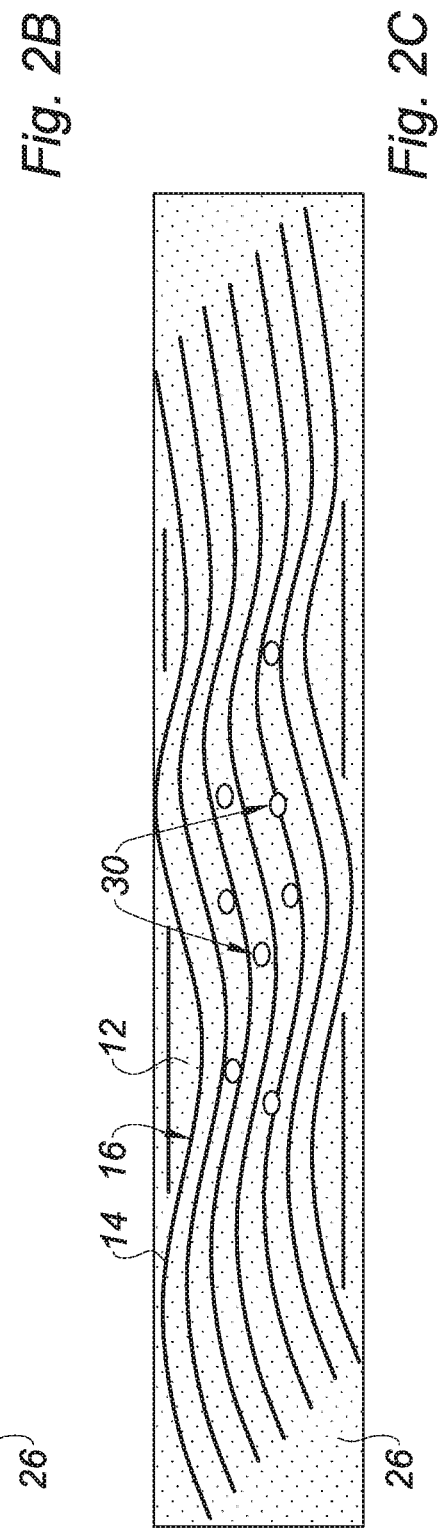

IMPREGNATION MOULD HAVING NEEDLES FOR PRODUCING A PART FROM A WOVEN PREFORM

The field of the present invention is that of the manufacture of gas-turbine engines, such as turbine engines, and in particular those intended for the propulsion of aircraft.

The present invention relates, more particularly, to an impregnation mould for manufacturing a turbine engine part made of a composite material, such as a turbine engine blade or an element of the outer fan casing of this turbine engine, which part is obtained during an RTM process by resin impregnation of a woven preform of the corresponding part, and to a method for producing this part using said mould.

PRIOR ART

The resin transfer moulding (RTM) process is a manufacturing process which is well known in the prior art and which consists in placing a fibrous preform, having at least one outer wall of dry fabric, in a sealed cavity in a mould shaped as a recess, and filling this cavity with an impregnation resin, generally an epoxy resin.

The outer wall of the preform, or the entire preform, is generally produced by weaving fibres such as carbon fibres.

For example, in the context of the manufacture of a preform made entirely of fibres, a basic three-dimensional weave is produced which is then cut to the shape of the preform to be obtained, which is then placed in an impregnation mould.

The impregnation mould generally has a lower portion having the cavity that defines a portion of the recess, and an upper portion which can be attached to the lower portion to close the mould, and which defines the other portion of the recess. During closure of the mould, the lower and upper portions of said mould are in abutment at a joint region.

Once the preform has been placed in the cavity of the lower portion of the impregnation mould and the upper portion of the mould has been closed onto said lower portion, the preform is impregnated with resin in the course of an injection operation during which liquid resin is injected into the impregnation mould.

In the course of this injection operation, a partial vacuum is generated in the mould and a thermosetting resin is injected into the impregnation mould, so as to impregnate the whole of the preform. As it spreads in the recess, the resin takes on the shape of the recess. The preform and the resin are then heated in order to polymerise—and therefore harden—the resin. The resin polymerised in this way produces a final, rigid part of which the shape matches that of the recess. The impregnation mould is then opened, and the final part is then taken out.

The arrangement of the preform in the recess may produce preferential paths for the flow of the resin. For example, these paths are located at the junction of the lower and upper portions of the impregnation mould along the edges of the mould or the edges of the preform. The resin flowing via these flow paths spreads more quickly than the resin impregnating the remainder of the preform. The result of this is a non-homogenous impregnation of the preform, which may result in the appearance of porous regions at the locations at which the resin has spread insufficiently. The position of these porous regions cannot generally be predicted, and therefore it is not possible to specifically arrange injection regions intended to overcome this drawback. Depending on the space left free by these preferential paths, the porosity defects may be more or less significant. However, porosity defects can generally only be noticed after the part has been injected and removed from the mould. Where the rate of porosity is too high, that is to say typically above 3%, the part has to be scrapped, because no repair procedure is then possible.

In order to overcome these drawbacks, D1 (EP-0.365.579-A1) proposed creating injection paths in the part prior to the introduction of an injection nozzle. The creation of these paths is difficult and expensive.

It was also proposed, in D2 (WO-91/18725-A1), to supply a fibrous part with resin using pipes that can be retracted during propagation of the resin. However, this method can be applied only to unorganised fibres and not to a weave.

In fact, another drawback to the RTM injection process is the difficulty encountered in fully impregnating the strands and the spaces situated between the strands of the weave of the part. A defect in the impregnation of the strands and/or the spaces between the strands also leads to the appearance of porosity defects in the part.

Furthermore, the impregnation and the progression of the polymerisation reaction are non-homogeneous phenomena that are influenced by the dimensions of the part and/or by the differences in the thickness thereof. Differences in impregnation and/or polymerisation between two regions of the part may lead to the generation, during moulding, of internal stresses within the part that may have not significant effects on its lifespan and on its deformation following removal from the mould.

For other purposes, it has also been proposed to produce other types of composite parts from preforms made of composite materials having a ceramic matrix, better known by the abbreviation CMC. This type of material is stiffened by gas infiltration.

This technical solution has other drawbacks. In particular, the material infiltrated in a gaseous form first of all infiltrates the superficial layers of the preform, thus making them sealed. From then on, the infiltrated material can no longer penetrate the interior of the preform. It is therefore necessary to partially remove the material of the superficial layer by machining before any new impregnation of the interior of the preform. The manufacture of the final part requires a succession of cycles of removal of material and impregnation before the final part is obtained.

DESCRIPTION OF THE INVENTION

The invention aims to propose a mould that allows resin to be injected into a woven preform by an RTM process and allows the problem of propagation of the resin at least within the weave of the preform to be overcome, whether this preform is made entirely of woven composite materials, as is the case, for example, when the preform is made from a three-dimensional weave, or when this preform is made only in part of composite materials, as is the case, for example, when the preform has an outer envelope made of woven composite materials that cover a core made of another material, such as, for example, a material having a foam structure.

To this end, the invention proposes an impregnation mould having injection needles capable of penetrating the weave of the preform in order to facilitate the injection of the resin into the centre of the weave of the preform.

More particularly, the invention proposes an impregnation mould for manufacturing a turbine engine part, made of composite material, obtained from a preform formed by a weave of fibres, said mould having a first mould portion of which a first recess is substantially complementary to a first surface of the preform, and a second portion of which a second recess is substantially complementary to a second surface of the preform, said first and second portions being capable of being attached to one another at the time said mould is closed so that the first and second recesses define a cavity in which at least one injection means of the mould allows a resin to be injected in order to impregnate said preform, characterised in that said at least one injection means has a plurality of tubular injection needles, which are capable of extending from at least one of the first and second recesses substantially with respect to at least one of the first and second surfaces and which are configured to penetrate at least the weave of the preform to allow resin to be injected while conveying said resin at least to the centre of said weave after the closure of said mould.

According to other features of the impregnation mould:
- the needles are retractable into at least one of the first and second mould portions, and are movable towards the preform relative to at least one of the first and/or second recess(es) in said portions between an extended position in which said needles penetrate at least the weave and a retracted position in which said needles are withdrawn from the preform;
- each of the first and second mould portions has a first and a second plurality of needles, respectively, which are capable of extending from said first and second recesses, respectively, with respect to the whole of the first and second surfaces, in order to penetrate at least the weave of the first and second surfaces;
- the needles of the first plurality of needles are not arranged to face the needles of the second plurality of needles;
- each needle of the first plurality or second plurality of needles is rigidly connected to at least one first or second block, the needles of said first or second block being substantially parallel to one another, and said first or second block being slideably moved towards the preform in parallel with a direction of the needles by means of a corresponding actuator in the corresponding first or second mould portion;
- each first or second mould portion receives at least two first or two second blocks, respectively, which are fitted slideably in the first or second mould portion, respectively, along different strokes, the stroke of each first or second block being configured to allow the needles to penetrate at least a corresponding region, of predetermined thickness, of the weave of the preform with respect to the corresponding first or second surface, respectively;
- the needles of each first or second block are supplied with resin according to a flow rate, pressure and injection duration configured to fill the predetermined thickness of the weave of the preform with respect to the corresponding first or second surface.

The invention also relates to a method for manufacturing a turbine engine part, made of composite material, using an impregnation mould of the type described above.

According to a first embodiment of this method, said method comprises successively:
- a step of producing a preform, made of composite materials, by weaving fibres;
- a step of placing the preform in a first or second recess formed in a first or second portion of the mould, respectively;
- a step of attaching the second portion of the mould, or the first portion of the mould, to the first portion of the mould, or the second portion of the mould, respectively;
- a step of insertion during which the plurality of needles of the injection means penetrates at least the weave of the preform;
- a step of closing the mould, consisting in attaching the second portion of the mould, or the first portion of the mould, to the first portion of the mould, or the second portion of the mould, respectively, at the end of which step the needles of the plurality of needles of the injection means occupy their extended position;
- a step of vacuum-injecting resin, during which the resin is injected at least into the weave of the preform by means of the needles and during which, as the injection progresses, the needles of the plurality of needles are retracted from their extended position towards their retracted position;
- a step of polymerising the resin, during which the resin is kept under pressure in the mould;
- a step of taking out the polymerised part.

According to a second embodiment of this method, said method comprises successively:
- a step of producing a preform, made of composite material, by weaving fibres, said preform having, with respect to each of its first or second surfaces, predetermined regions of different thicknesses;
- a step of placing the preform in a first or second recess formed in a first or second portion of the mould, respectively;
- a step of attaching the second portion of the mould, or the first portion of the mould, to the first portion of the mould, or the second portion of the mould, respectively;
- a step of insertion during which the first blocks of the first mould portion and the second blocks of the second mould portion are moved independently of one another by means of their respective actuators such that the needles of the pluralities of needles of said first blocks and second blocks penetrate at least the thicknesses of each region of the weave of the preform;
- a step of closing the mould, consisting in attaching the second portion of the mould, or the first portion of the mould, to the first portion of the mould, or the second portion of the mould, respectively, and at the end of which step the needles of the pluralities of needles of the first and second blocks occupy their extended position;
- a step of vacuum-injecting resin, during which the resin is injected at least into the weave of the preform by means of the needles and during which, simultaneously, the first and second blocks are moved by means of their actuators such that the needles of said blocks are retracted from their extended position towards their retracted position;
- a step of polymerising the resin, during which the resin is kept under pressure in the mould;
- a step of taking out the finished polymerised part.

Whatever the intended embodiment of the manufacturing method, said method comprises, prior to the step of placing the preform, a step of selecting needles, during which the diameter of each needle is determined on the basis of a viscosity of the resin to be injected and a flow rate of the resin to be injected, and by the space between two strands of the weave of the preform, said diameter being configured to be less than said space between two strands.

BRIEF DESCRIPTION OF THE DRAWINGS

The present invention will be better understood and other details, features and advantages thereof will become more apparent upon reading the description that follows, given by way of non-limiting example and with reference to the accompanying drawings, in which:

FIG. 2A to 2C are schematic perspective views showing the progression of a CMC composite material infiltrated in the gas phase into a woven-fibre preform wall according to the prior art;

In the description that follows, identical reference numbers denote parts that are identical or have similar functions.

DETAILED DESCRIPTION OF THE DRAWINGS

Figure 1A:
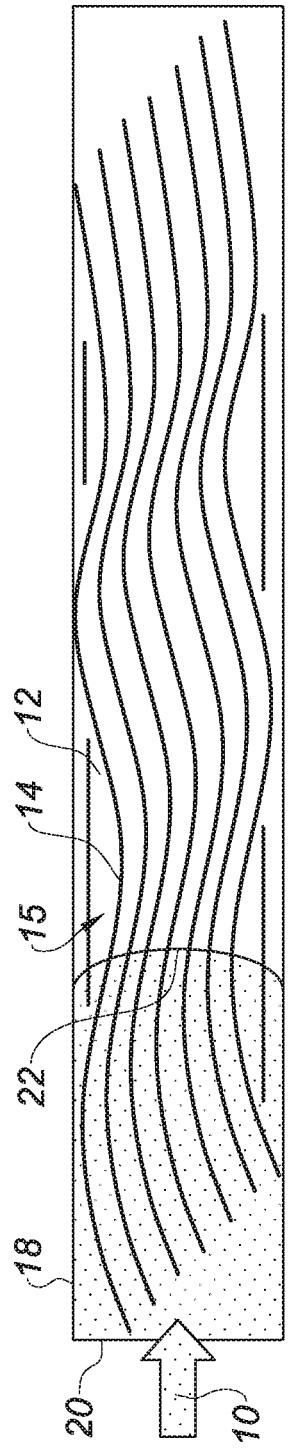
FIG. 1A to 1C are schematic perspective views showing the progression of the resin during RTM injection of a woven-fibre preform wall according to the prior art.
Figure 1B:
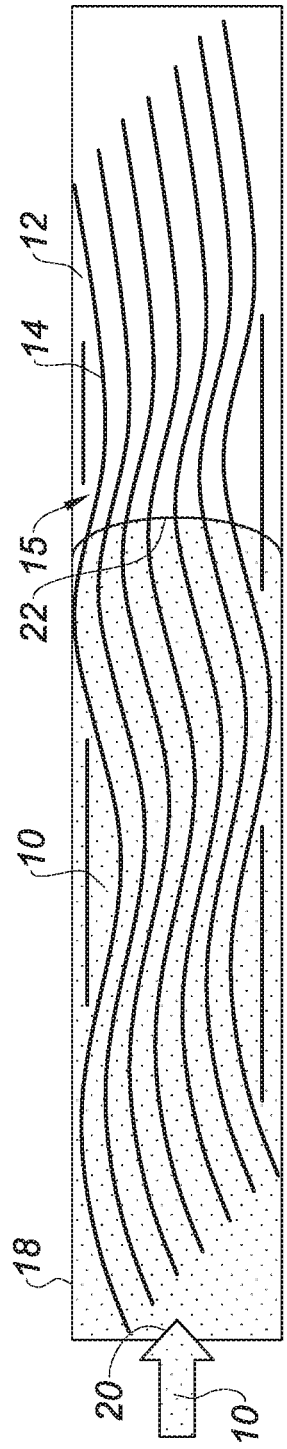
Figure 1C:
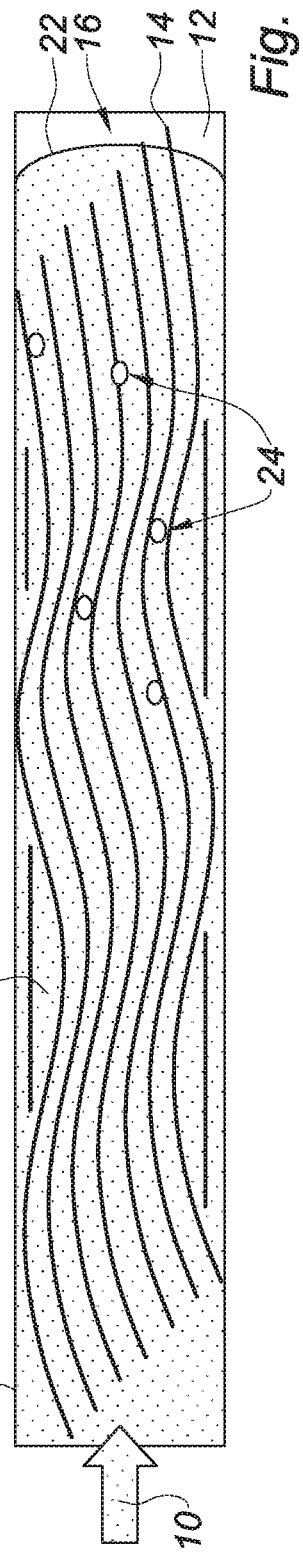

FIG. 1A to 1C show the progression of a resin 10 in a wall 12 of woven fibres 14 of a preform 15 in the context of an RTM injection process. As shown in FIG. 1A, the resin 10 is injected in the usual manner into a mould 18 from an injection point 20. The resin 10 propagates from the injection point 20 inside the fibres 14 of the preform 15, following a propagation front 22 until said resin fills almost all of the mould 18, as shown in FIG. 1C. The drawback of this design is that the propagation of the resin 10 in the mould 18 is not uniform. In particular, the resin may propagate along preferential propagation paths (not shown in FIG. 1A to 1C), the result of which is that regions 24 that are not impregnated with resin 10 are left behind in the fibres 14 of the finished part 16. After the preform 15 has been polymerised, these regions 24 constitute defects in the part 16, which lead to the part 16 being scrapped.

Another drawback of this design is that, during polymerisation, the viscosity of the resin increases near the injection point, thus generating a pressure gradient between the injection point and a vent in the mould. It is therefore not possible to ensure a hydrostatic hold pressure during the curing phase. Consequently, the regions close to the vent are subject to lower resin pressure and are more likely to produce porous regions, commonly referred to as chemically porous regions.

Another design known in the prior art and shown in FIG. 2A to 2C consists in subjecting the wall 12 of the preform 15 to gas infiltration by a ceramic matrix 26, which is shown in FIG. 2A by arrows surrounding the preform 15. The drawback to this design is that the ceramic matrix 26 infiltrated in the gas phase naturally first fills the fibres 14 of the preform 15 close to the region through which the matrix 26 is infiltrated. Consequently, as it solidifies, the ceramic matrix 26 tends to reduce the porosity of the part 16, thus considerably reducing the infiltration possibilities for the regions that have not yet been reached by the matrix 26. As shown in FIG. 2B, this results in the appearance of regions 28 which are difficult for the ceramic matrix to infiltrate, which leads to the appearance of porosity defects 30 in the finished part 16, as shown in FIG. 2C.

FIG. 3A to 8 show an impregnation mould 18 produced according to the invention, for impregnating a preform 15 made of composite materials. The impregnation mould 18 is intended to be used to produce parts 16 produced by weaving fibres (not shown in FIG. 3A to 8). This may involve, for example, preforms 15 having three-dimensional fibre weaves, or preforms 15 having two-dimensional fibre weaves, which are superimposed one on top of the another and/or cover an insert of a different material, such as an insert 28 of the type shown in FIG. 6A to 8.

FIG. 3A to 8 show a preform 15 intended for forming a turbine engine blade, but it should be understood that this representation does not limit the invention, and that, for example, the part 16 could be another element made of composite materials, such as, for example, a fan casing element.

In a known manner, the mould 18 has a first mould portion 30 of which a first recess 32 is substantially complementary to a first surface 34 of the preform 15. The mould 18 also has a second mould portion 36 of which a second recess 38 is substantially complementary to a second surface 40 of the preform 15. In the drawings, the first mould portion 30 is an upper portion whereas the second mould portion 36 is a lower portion. It should be understood that this configuration does not limit the invention, and that the first and second mould portions 30, 36 could both be arranged vertically or in another orientation.

As shown in FIG. 3C to 5 and FIG. 6C to 8, the first and second portions 30, 36 are capable of being attached to one another during the closure of the mould 18 in order to sealingly define a cavity of a size corresponding substantially to that of the part to be obtained. In this cavity, at least one injection means 42, 44 allows a resin to be injected in order to impregnate the preform 15.

Conventionally, an injection means of this kind is formed by a conduit that leads to the interior of the recess. A mould of the same type as the mould 18 may potentially have a plurality of injection means. However, it has been noted that the conventional injection means do not allow the fibres of the preform 15 to be impregnated uniformly, which results in the appearance of porosity defects in the finished part.

In order to overcome this drawback, the invention proposes at least one injection means 42, 44 having a plurality of tubular needles 46, 48 intended to penetrate the weave of the preform 15 and to convey the resin therein.

In the embodiments of the invention shown in FIG. 3A to 8, the first mould portion 30 and second mould portion 36 have injection means 42, 44, respectively, which have pluralities of needles 46 and 48, respectively.

In particular, a first plurality of needles 46 and a second plurality of needles 48 are capable of extending from the first recess 32 and second recess 38, respectively, substantially with respect to the first and second surfaces 34, 40 of the preform 15 in order to penetrate the weave of the preform 15 so that the resin can be injected at least into the centre of said weave after closure of the mould 18 by conveying the resin therein.

Advantageously, the first plurality of needles 46 and the second plurality of needles 48 are arranged facing the whole of the first and second surfaces 34, 40 so as to penetrate practically the whole of the weaves of the preform 15.

The dimensions of the needles are dependent on different parameters. Firstly, their length is configured to allow them to penetrate the thickness of the fibres of the preform to a depth sufficient to allow the entirety of the fibres to be impregnated. Secondly, since the needles are tubular, their diameter is a result of a compromise between the requirement for a diameter large enough to allow the resin to circulate internally and the requirement for a diameter that is nevertheless sufficiently small to avoid any risk of damaging the preform when the needles are introduced between the fibres of the preform. By way of example, a needle diameter of 1 mm is an appropriate size. It should also be noted that the ends of the needles are preferably tapered in order to facilitate the penetration of the needles between the strands of the fibres of the preform.

In the configuration shown in FIG. 3A to 8, as has been seen, the preform may be a preform made of a three-dimensional weave of fibres as shown in FIG. 3A to 5, or a preform made of at least one layer of a two-dimensional weave of fibres that covers an insert 28 as shown in FIG. 6A to 8. In both cases, the pluralities of needles 46, 48 are configured to penetrate the weave only, but it should be understood that this arrangement does not limit the invention.

This is because, for example, in the case of the preform made of at least one layer of a two-dimensional weave of fibres that covers an insert 28 as shown in FIG. 6A to 8, the pluralities of needles 46, 48 could be configured to also penetrate the insert 28 and inject the resin therein, without changing the nature of the invention.

The pluralities of needles 46, 48 are configured to penetrate the weave of the preform 15 and to be removed therefrom before the resin is polymerised. Indeed, although the injection is improved by the invention by allowing the needles to penetrate the weave of the preform 15, it is nevertheless necessary that the pluralities of needles 46, 48 may be removed from said weave before the resin polymerises and before the needles may no longer be withdrawn from the preform 15. Therefore, another important feature of the invention is that the needles can be retracted into the first and second mould portions 30, 36, and are movable towards the preform 15 relative to the first or second recess 32, 38 in said portions, respectively. The pluralities of needles 46, 48 are each movable between a retracted position in which they are retracted into the first and second mould portions 30, that is to say a position in which they do not project from the first or second recesses 32, 38, and an extended position in which they penetrate at least the weave of the preform 15.

Figure 3A:
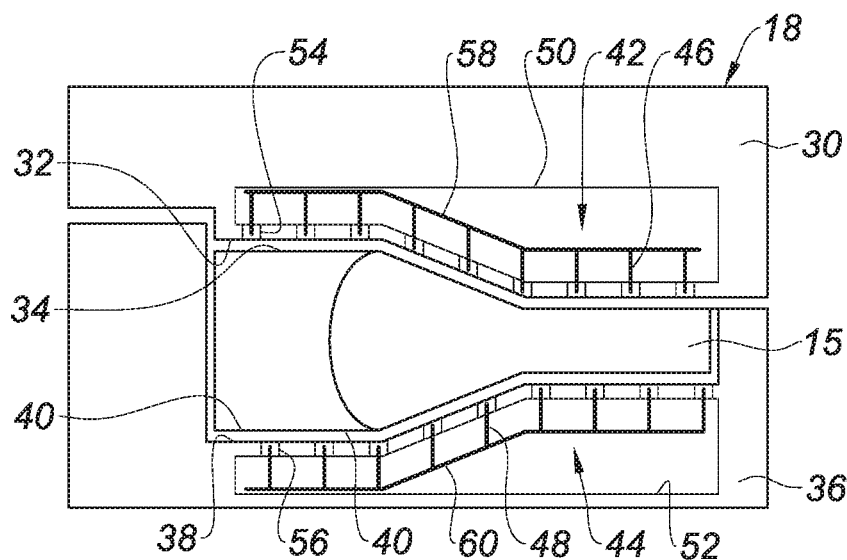
FIG. 3A to 3C are schematic views in longitudinal cross section showing the phases of the step of closing an impregnation mould of the method according to the first embodiment of the invention.
Figure 5:
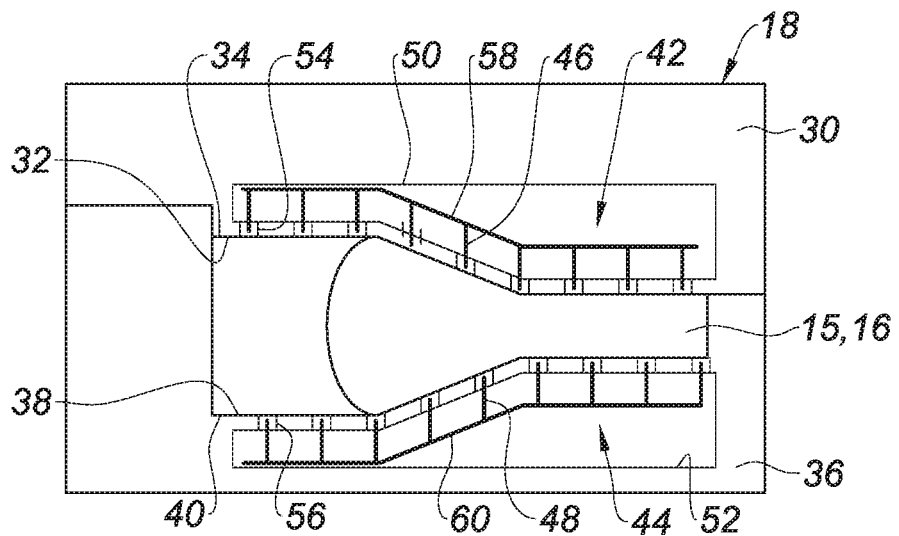
FIG. 5 is a schematic view in longitudinal cross section showing the polymerisation step of the method according to the first embodiment of the invention.
Figure 6A:
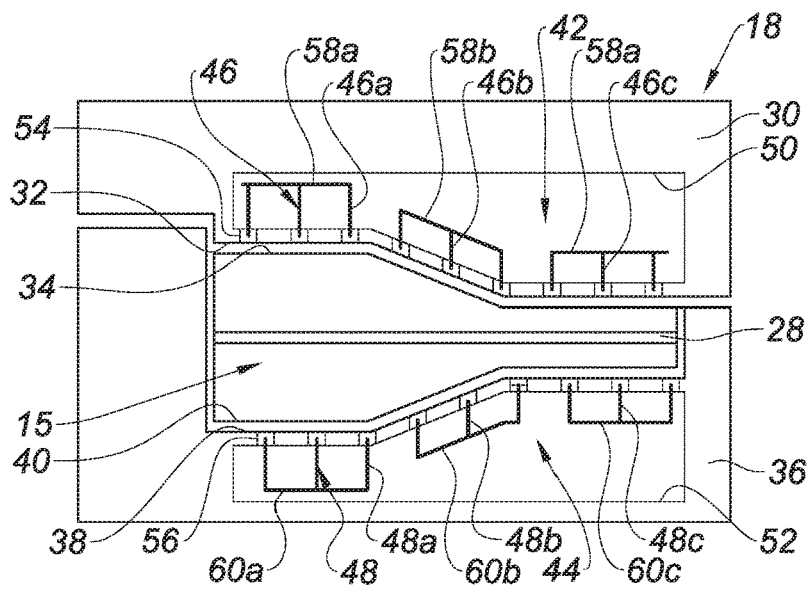
FIG. 6A to 6C are schematic views in longitudinal cross section showing the phases of the step of closing an impregnation mould of the method according to the second embodiment of the invention.
Figure 8:
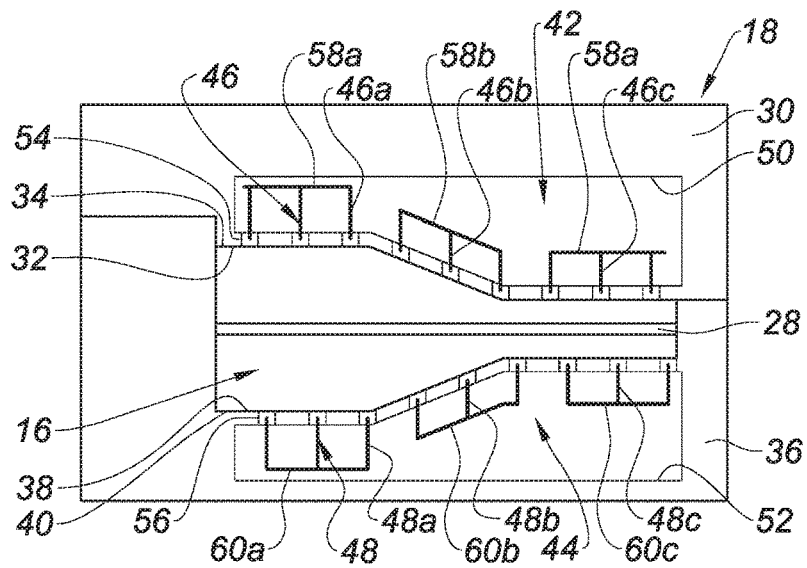
FIG. 8 is a schematic view in longitudinal cross section showing the polymerisation step of the method according to the second embodiment of the invention.

The retracted position of the pluralities of needles 46, 48 corresponds, firstly, to a position prior to their penetration of the weave of the preform 15 and therefore prior to the injection of resin as shown in FIG. 3A and 6A, or, secondly, to a withdrawal position subsequent to the injection of resin, as shown in FIGS. 5 and 8.

In the retracted position of the needles in the first and second mould portions 30, 36 that is prior to the penetration of the weave by said needles, it should be understood that the needles do not project from the particular first or second recess 32, 38 in said portions so that, in particular, they do not obstruct the positioning of the preform 15 in the first and second mould portions 30, 36.

In the retracted position of the needles in the first and second mould portions 30, 36 that is subsequent to the injection of resin, the needles, though retracted, are nevertheless able to continue exerting a resin pressure within the recess so as to compensate for the withdrawal phenomena of the resin impregnating the preform during its polymerisation. To that end, the retracted position in which the pluralities of needles 46, 48 have been withdrawn is preferably configured so that the ends of the needles, while being removed from the fibres of the preform to prevent them from marking the preform when the resin is polymerised, are nevertheless placed in direct proximity to the outer surface of the preform in order to allow an adequate resin pressure to be maintained during polymerisation.

Figure 4A:
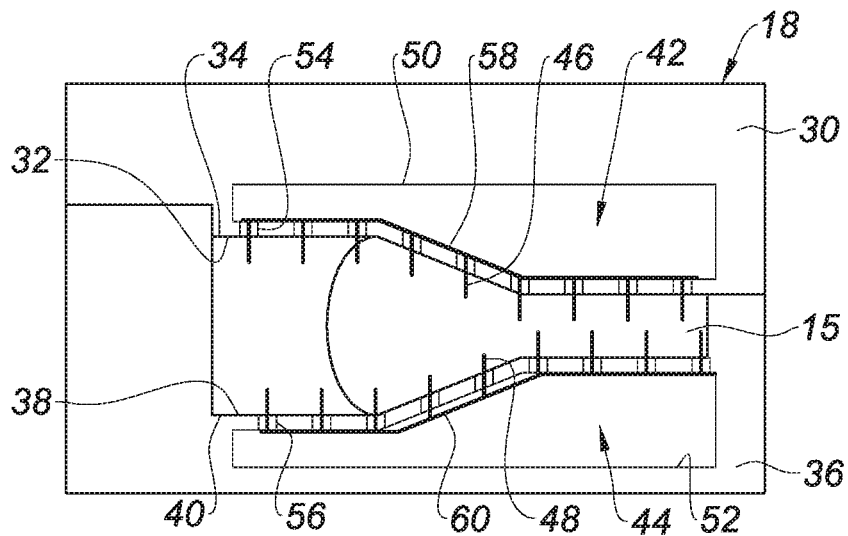
FIGS. 4A and 4B are schematic views in longitudinal cross section showing the start and end phases of the injection step of the method according to the first embodiment of the invention.
Figure 4B:
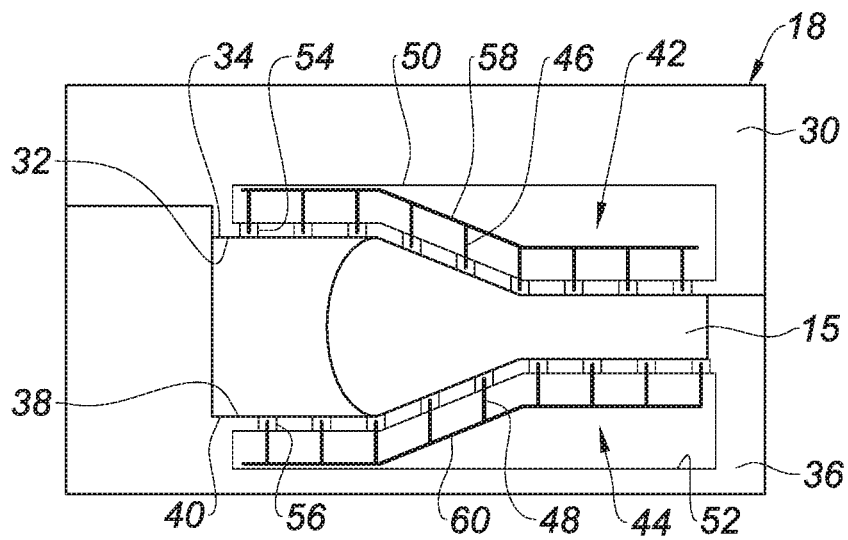
Figure 7A:
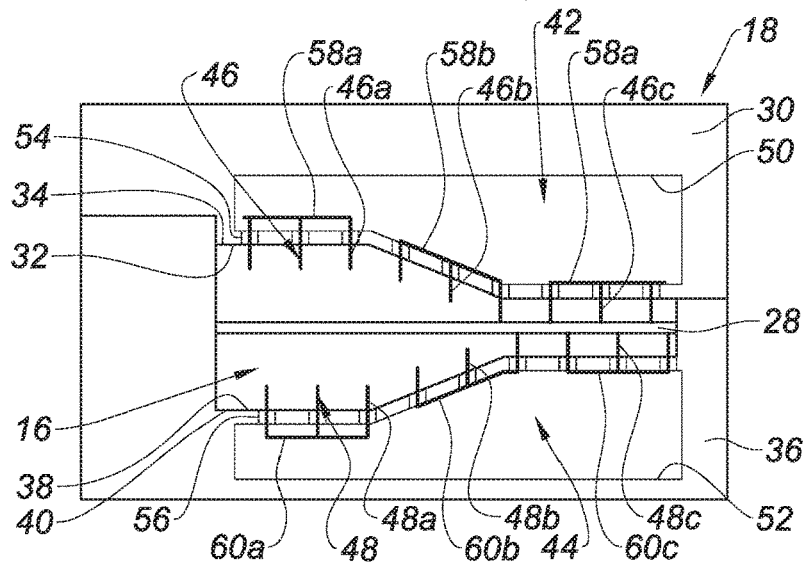
FIGS. 7A and 7B are schematic views in longitudinal cross section showing the start and end phases of the injection step of the method according to the second embodiment of the invention.
Figure 7B:
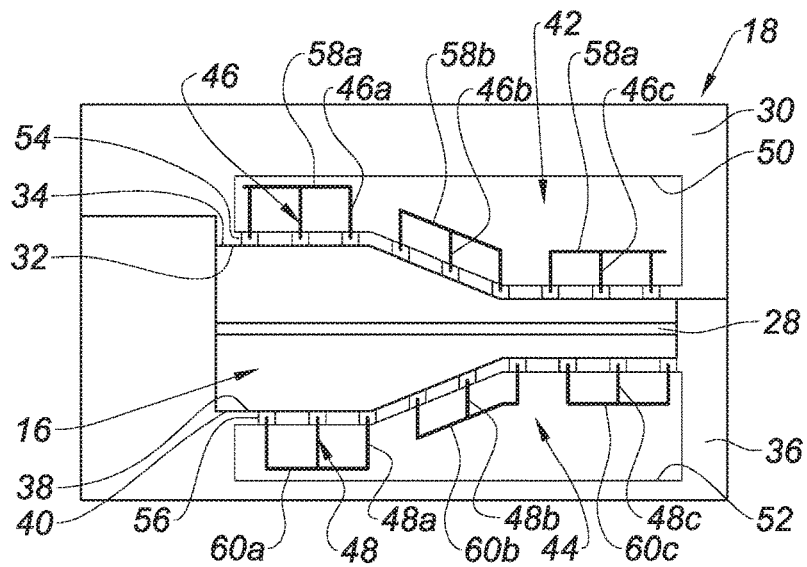

The extended position of the pluralities of needles 46, 48 is shown in FIG. 4A and FIG. 7A. Between this extended position and the retracted position in FIGS. 3A, 5, 6A and 8, the pluralities of needles 46, 48 can occupy a plurality of intermediate positions in a controlled manner, as will be seen in the next part of this description.

Figure 3B:
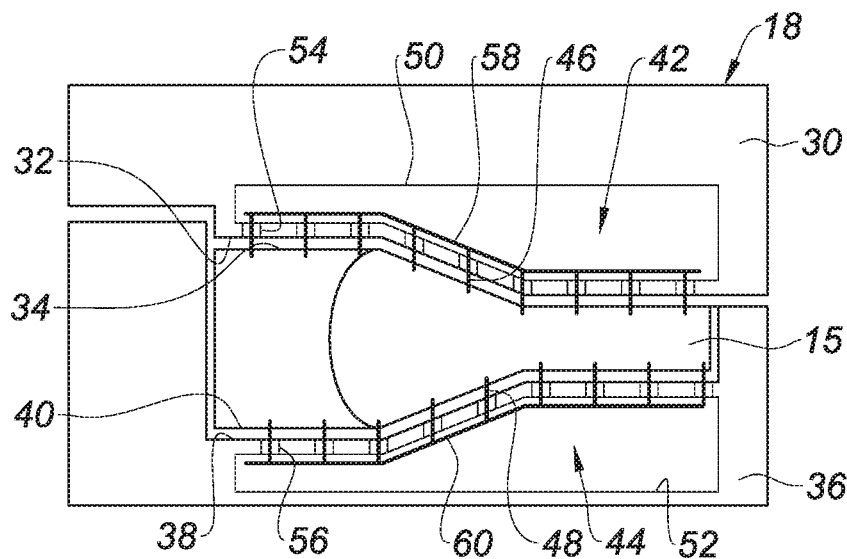
Figure 6B:
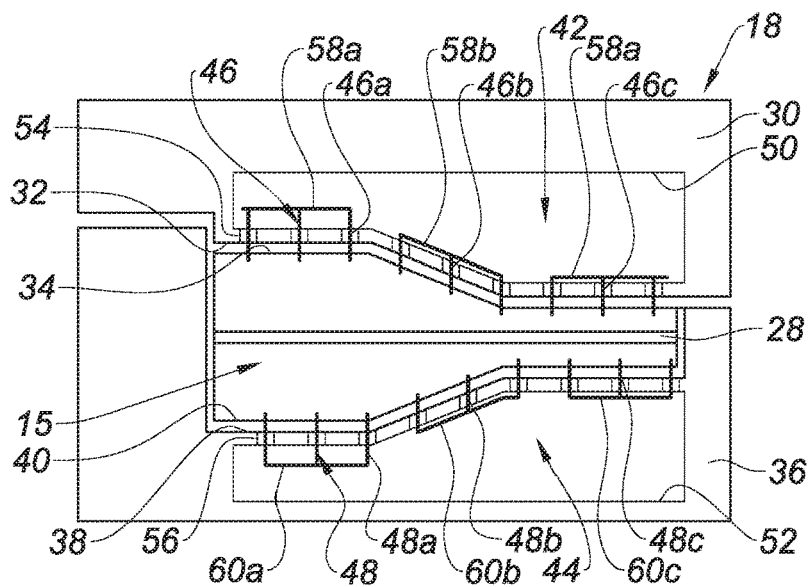

The possibility of controlling the position of the needles is intended, firstly, to allow the needles of the pluralities of needles 46, 48 to be inserted, in part, into the weave of the preform 15 prior to the closure of the portions 30, 36 of the mould 18, as shown in FIGS. 3B and 6B, this partial insertion prior to closure of the mould portions being particularly advantageous because at this stage the fibres of the preform 15 are still relatively relaxed. The reason for this is that the closure of the two mould portions 30, 36 brings about a final compaction of the preform 15, and consequently a compression of the fibres. The introduction of the plurality of needles 46, 48 before the preform is closed allows the needles to be inserted into relatively slack fibres and therefore reduces the risk of the fibres of the preform 15 being broken by the needles of the plurality of needles 46, 48.

Figure 3C:
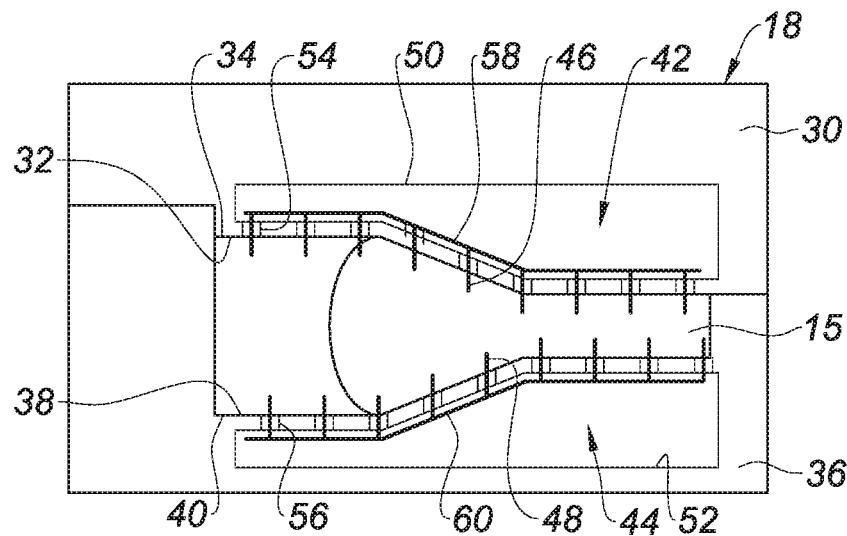
Figure 6C:
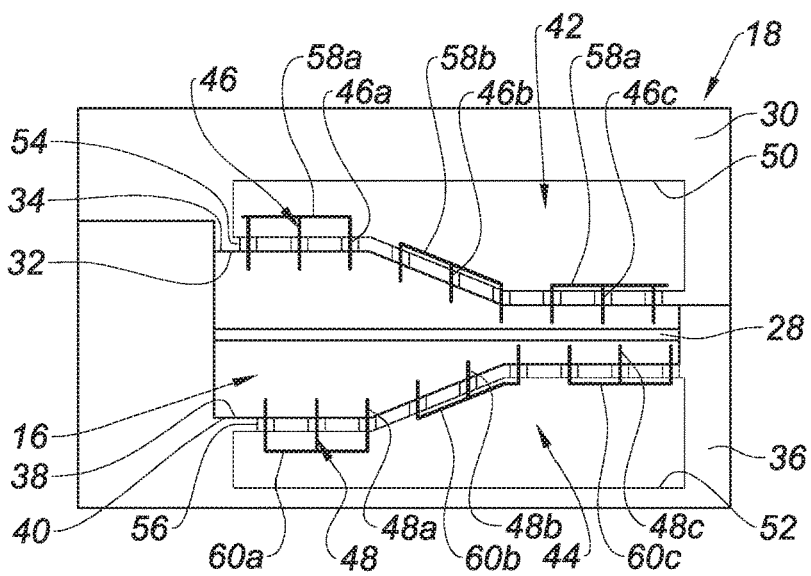

It should be noted that the relative position of the needles in relation to the mould portions 30, 36 is maintained as it is once the portions 30, 36 of the mould 18 have been closed, as shown in FIGS. 3C and 6C.

Secondly, the possibility of controlling the position of the needles is intended to allow the needles of the pluralities of needles 46, 48 to be gradually withdrawn from their extended position in FIGS. 4A and 7A, as far as their retracted position in FIGS. 5 and 8 so as to allow the weave of the preform 15 to be impregnated by layers of propagation of the resin, from the layers furthest from the recesses 32, 38 as far as the layers closest to the surfaces 34, 40 of the preform 15.

By comparison with a conventional impregnation mould 18, this configuration prevents the resin from obstructing the weave near to the surfaces 34, 40 of the preform 15 and does not prevent the resin from penetrating further towards the centre of the weave. This is because, by injecting the resin, by means of the needles, into the regions of the weave furthest from the surfaces 34, 40 of the preform 15, and then injecting it increasingly close to these surfaces 34, 40 during the impregnation stage, a total and uniform impregnation of the thickness of the weave of the preform 15 is thus ensured.

Furthermore, in order to promote the greatest possible dispersal of the resin in the weave of the preform 15, and to prevent any collisions between the needles of the pluralities of needles 46 and 48 in the case of thin parts, the needles of the first plurality of needles 46 and the needles of the second plurality of needles 48 are not arranged to face one another.

It is possible, for example, for each needle of the first plurality of needles 46 to be slightly offset in relation to the neighbouring needle of the opposite, second plurality of needles 48, in the transverse direction in relation to the general orientation of the needles, thus forming a staggered-row pattern.

However, as can be seen in FIG. 3A to 8, the needles of the pluralities of needles 46, 48 are preferably offset in an equidistant manner from the needles opposite and are therefore arranged in staggered rows. This configuration ensures a homogeneous distribution of the resin transversely in each resin injection layer.

Any means known from the prior art that ensures the movability of the first plurality of needles 46 and second plurality of needles 48 relative to the respective mould portions 30, 36 may be suitable for the proper implementation of the invention.

By way of example, and in a non-limiting manner, each first or second mould portion 30, 36 has a housing 50, 52, respectively, which communicates with the recess 32, 38, respectively, by means of a plurality of perforations 54, 56 intended to allow the passage of the needles of the first and second pluralities of needles 46, 48, respectively. Each of the housings 50, 52 receives a single first or second block 58, 60, respectively, that carries the plurality of needles 46, 48 with which said block is associated.

The needles in the same block 46, 48 are preferably substantially parallel to one another. Indeed, this configuration facilitates the insertion of the needles into, and particularly the withdrawal thereof from, the preform 15 without the risk of breaking them. A slight flaw in the parallelism in consideration of the flexibility of the needles may nevertheless be allowed.

Each first or second block 58, 60 is slideably movable in parallel with the direction of the needles in a controlled manner within the corresponding housing 50, 52. For that purpose, any means known from the prior art may be suitable for moving the block 58, 60. For example, each block 58, 60 may be moved by means of an electric actuator (not shown).

Each first or second block 58, 60 may also be moved by means of a hydraulic actuator and/or be configured in the form of a piston subject to a hydraulic pressure in the housing 50, 52, i.e. configured in the form of a hydraulic cylinder chamber, this cylinder preferably being a double-acting cylinder that allows the corresponding block 58, 60 to be moved in either direction.

In a first embodiment of the mould 18, which is shown in FIG. 3A to 5, as has been seen, the housing 50 has a single first block 58 and the housing 52 has a single second block 60.

According to a second embodiment of the mould 18, which is shown in FIG. 6A to 8, the first mould portion 30 receives, in its cavity 50, at least two first blocks 58a, 58b, 58c, each carrying a corresponding plurality of needles 46a, 46b, 46c, respectively. FIG. 6A to 8 therefore show three different pluralities of needles 46a, 46b, 46c received in the cavity 50 in the first mould portion 30, but it should be understood that this configuration does not limit the invention, and that the cavity 50 may comprise a smaller or greater number of pluralities of needles.

In the same manner, the second mould portion 36 receives, in its cavity 52, at least two second blocks 60a, 60b, 60c, each carrying a corresponding plurality of needles 48a, 48b, 48c, respectively. This configuration does not limit the invention; it should be understood that the cavity 52 could comprise a smaller or greater number of pluralities of needles.

The first blocks 58a, 58b, 58c are movable independently of one another and, likewise, the second blocks 60a, 60b, 60c are slideably movable independently of one another. This configuration allows these blocks to be movable along different strokes, it therefore being possible for the stroke of each first block 58a, 58b, 58c or of each second block 60a, 60b, 60c to be configured to allow the needles of the corresponding pluralities of needles 46a, 46b, 46c or 48a, 48b, 48c to penetrate the weave in a region of the preform 15 of predetermined thickness.

This configuration is of particular interest in the case of a preform 15 of which the weave is not of a constant thickness, as shown in FIG. 6A to 8. As can be seen for example, the weave of the preform 15 is of a maximum thickness opposite the first and second pluralities of needles 46a, 48a, of an intermediate thickness opposite the first and second pluralities of needles 46b, 48b, and of a minimum thickness opposite the first and second pluralities of needles 46c, 48c. It is therefore understood that, in order to be able to impregnate the whole of the weave in each of these regions, it is necessary to move the blocks 58a, 58b, 58c and 60a, 60b, 60c along different strokes Ca, Cb, Cc, as shown in FIG. 6B, with reference to the retracted position which is represented by dotted lines as being identical to that in FIG. 6A, the stroke of a block becoming greater as the weave thickness that it has to penetrate increases.

This configuration may also be of interest in the case (not shown) in which it is desirable for the needles to penetrate the preform 15 in different directions. In this case, it could be envisaged for some of the blocks to be movable not in parallel with one another, but in different directions.

In this configuration, it should be understood that, whatever the embodiment of the invention may be, the quantity of resin injected into a predetermined weave thickness must be adjusted precisely on the basis of the thickness of this weave.

Consequently, another advantageous feature of the invention is that the needles 46a, 46b, 46c of each first block 58a, 58b, 58c or the needles 48a, 48b, 48c of each second block 60a, 60b, 60c are supplied with resin in accordance with the individual flow rates, pressures and injection durations thereof. Thus, for each block, taken independently of the others, the stroke is configured to fill the corresponding predetermined thickness of the weave of the preform 15 with respect to the corresponding first or second surface 34, 40 of said preform 15. Thus, it is possible to supply resin differentially among the needles 46a, 46b, 46c of the blocks 58a, 58b, 58c or the needles 48a, 48b, 48c of the blocks 60a, 60b, 60c in order to optimally promote the filling of the weave of the preform 15. For example, the needles 46a, 48a of the blocks 58a, 60a will have to allow a greater quantity of resin to pass in comparison with the needles 46b, 48b of the blocks 58b, 60b or in comparison with the needles 46c, 48c of the blocks 58c, 60c, and for that purpose the resin that passes through the needles 46a, 48a will be subject to a higher flow rate and/or a higher pressure, and/or a longer injection duration in comparison with the needles 46b, 48b, 46c, 48c of the other blocks.

It is also important to note that the flow rate, pressure and injection duration are not the only parameters to take into consideration in order to achieve optimum impregnation of the weave of the preform 15. This is because, whatever embodiment of the invention is selected, the diameter of the tubular needles 46, 46a, 46b, 46c, 48, 48a, 48b, and 48c will preferably be determined on the basis of the viscosity of the resin to be injected, the flow rate of the resin to be injected, and the weave of the preform 15. Indeed, depending on the density of the weave of this preform, that is to say the space between two consecutive strands of the weave of this preform, the diameter of the tubular needles 46, 46a, 46b, 46c, 48, 48a, 48b will have to be set so as to allow the weave to be penetrated between two strands without this leading to these strands being torn, which would risk weakening the weave.

Figure 9:
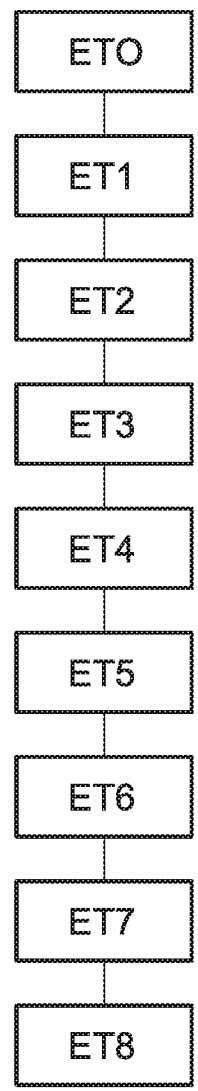
FIG. 9 is a block diagram showing the steps of the method according to the first or second embodiments of the invention.

Under these conditions, there are two embodiments of a method for manufacturing a turbine engine part, made of composite material, using a mould 18 as described above, depending on whether or not the weave of the preform is of a constant thickness.

Where the weave of the preform 15 is of a constant thickness, the method to which the invention relates is associated with a mould 18 according to the first embodiment of the invention. In this case, as shown in FIG. 9, the method to which the invention relates comprises firstly a step ET0 during which the needles 46, 48 are selected on the basis of the viscosity of the resin to be injected, the flow rate of the resin to be injected, and the density of the weave of the preform 15, that is to say the space between two strands of said weave.

The method also comprises a step ET1 of producing a preform 15, made of composite materials, by weaving fibres, for example carbon fibres. This step may be prior to, simultaneous with, or subsequent to the step ET0. There then follows a step ET2 of placing the preform 15 in one of the first or second recesses 32, 38 formed in the first or the second portion 30, 36 of the mould 18, respectively. Since the needles occupy the position thereof in which they are retracted in the first and second mould portions 30, 36, said needles do not project from the particular first or second recess 32, 38 in said portions and do not obstruct the positioning of the preform 15 in the first and second mould portions 30, 36.

There then follows a step ET3 of attaching the second portion 36 of the mould, or the first portion 30 of the mould, to the first portion 30 of the mould, or to the second portion 36 of the mould, respectively. At this stage, the mould 18 is not yet closed. There then follows, with the first and second mould portions 30, 36 kept immovable, a step ET4 of insertion during which the needles 46, 48 of the injection means penetrate at least the weave of the preform 15.

This step is intended to promote the penetration of the weave by the needles 46, 48. It is not necessary for the needles 46, 48 to penetrate the weave of the preform 15 deeply as this step ET4 is intended only to allow the needles 46, 48 to be inserted into the weave of the preform 15, which is not yet totally compacted since the first and second portions 30, 36 are not closed one against one another.

There then follows a step ET5 of closing the mould 18, consisting in attaching the second portion 36 of the mould, or the first portion 30 of the mould, to the first portion 30 of the mould, or the second portion 36 of the mould, respectively. In this way, the mould 18 is therefore first of all closed, and then the needles 46, 48 are extended into the weave. At the end of this step ET5 the needles 46, 48 occupy their extended position.

It should be noted that, in a variant (not shown), it is possible to place the needles in their extended position during the step ET4, so as to take advantage of the relatively relaxed state of the fibres of the preform 15 as far as possible before said preform is compacted by the mould portions 30, 36. In this case, the step ET5 consists simply in attaching the second portion 36 of the mould to the first portion 30 of the mould.

A step ET6 of vacuum-injecting resin is then performed, during which the resin is injected at least into the weave of the preform 15 by means of the needles 46, 48 and during which, as the injection progresses, the needles 46, 48 are retracted from their extended position towards their retracted position, in order to allow the weave of the preform 15 to be filled from the layers furthest from the surfaces 34, 40 of said preform as far as the layers closest to the surfaces 34, 40 of said preform. There then follows a step ET7 of polymerising the resin, during which the needles 46, 48 are retracted, but during which the resin pressure is maintained in the mould 18 so as to compensate for any shrinking of resin at the surface of the part 16 during polymerisation of the resin. Lastly, during a step ET8, the polymerised part 16 is removed, in order to convey it to subsequent steps such as steps of machining or bonding glass plies, which steps are not part of the method to which the present invention relates.

Where the weave of the preform 15 is not of a constant thickness, the method to which the invention relates is associated with a mould 18 according to the second embodiment of the invention. In this case, as shown in FIG. 9, the method to which the invention relates comprises firstly a step ET0 during which the needles 46a, 46b, 46c, 48a, 48b, 48c are selected on the basis of the viscosity of the resin to be injected, the flow rate of the resin to be injected, and the density of the weave of the preform 15, that is to say the space between two strands of said weave. The method also comprises a step ET1 of producing a preform 15, made of composite materials, by weaving fibres, for example carbon fibres. This step may be prior to, simultaneous with, or subsequent to the step ET0. There then follows a step ET2 of placing the preform 15 in one of the first or second recesses 32, 38 formed in the first or the second portion 30, 36 of the mould 18, respectively. There then follows a step ET3 of attaching the second portion 36 of the mould, or the first portion 30 of the mould, to the first portion 30 of the mould, or to the second portion 36 of the mould, respectively. At this stage, the mould 18 is not yet closed. There then follows, with the first and second mould portions 30, 36 kept immovable, a step ET4 of insertion during which the needles 46a, 46b, 46c, 48a, 48b, 48c of the injection means penetrate at least the weave of the preform 15. In this step, the first blocks 58a, 58b, 58c of the first mould portion 30 and the second blocks 60a, 60b, 60c of the second mould portion 36 are moved independently of one another such that the needles 46a, 46b, 46c of the first blocks 58a, 58b, 58c and the needles 48a, 48b, 48c of the second blocks 60a, 60b, 60c penetrate at least the thicknesses of each region of the weave of the preform 15. This step is intended to promote the penetration of the weave by the needles 46a, 46b, 46c, 48a, 48b, 48c.

There then follows a step ET5 of closing the mould 18, consisting in attaching the second portion 36 of the mould, or the first portion 30 of the mould, to the first portion 30 of the mould, or the second portion 36 of the mould, respectively. In this way, the mould 18 is therefore first of all closed, and then the needles 46a, 46b, 46c, 48a, 48b, 48c are extended into the weave along the different strokes Ca, Cb, Cc, the objective being that, at the end of this step, the end of each needle 46a, 46b, 46c, 48a, 48b, 48c is placed, in the weave, furthest from the surfaces 34, 40 of the preform 15.

It should be noted that, in a variant (not shown), it is possible, as before, to place the needles in their extended position during the step ET4, so as to take advantage of the relatively relaxed state of the fibres of the preform 15 as far as possible before said preform is compacted by the mould portions 30, 36. In this case, the step ET5 consists simply in attaching the second portion 36 of the mould to the first portion 30 of the mould.

At the end of this step ET5, the needles 46a, 46b, 46c, 48a, 48b, 48c occupy their extended position.

A step ET6 of vacuum-injecting resin is then performed, during which the resin is injected at least into the weave of the preform 15 by means of the needles 46, 48 and during which, as the injection progresses, the first blocks 58a, 58b, 58c and the second blocks 60a, 60b, 60c associated with the needles 46a, 46b, 46c and 48a, 48b, 48c, respectively, are moved by means of their actuators such that the needles 48a, 48b, 48c are retracted from their extended position towards their retracted position. This operation allows the weave of the preform 15 to be filled from the layers furthest from the surfaces 34, 40 of said preform as far as the layers closest to the surfaces 34, 40 of said preform. There then follows a step ET7 of polymerising the resin, during which the needles 46a, 46b, 46c, 48a, 48b, 48c are retracted, but during which the resin pressure is maintained in the mould 18 so as to compensate for any shrinking of resin at the surface of the part 16 during polymerisation of the resin. Lastly, during a step ET8, the polymerised part 16 is removed.

The invention allows the RTM injection of parts 16 made of woven composite materials to be substantially improved, and the number of these parts 16 that are scrapped to be substantially reduced.

The invention claimed is:

1. A set for manufacturing a turbine engine part,
   wherein said set comprises a preform and an impregnation mould,
   wherein said preform is formed by a weave of fibres of composite material having strands for being impregnated in said impregnation mould,
   wherein said mould has a first mould portion of which a first recess is substantially complementary to a first surface of the preform, and a second portion of which a second recess is substantially complementary to a second surface of the preform, said first and second portions being capable of being attached to one another at the time said mould is closed so that the first and second recesses define a cavity in which at least one injection means of the mould allows a resin to be injected in order to impregnate said preform,
   wherein said at least one injection means has a plurality of tubular injection needles, for extending from at least one of the first and second recesses substantially with respect to at least one of the first and second surfaces and which are configured with tapered ends to penetrate at least between the strands of weave of the preform to allow resin to be injected while conveying said resin at least to the centre of said weave after the closure of said mould,
   wherein the needles of the mould are retractable into at least one of the first and second mould portions, and are movable towards the preform relative to at least one of the first recess and second recess in said portions between an extended position in which said needles penetrate at least the weave and a retracted position in which said needles are withdrawn from the preform, and
   wherein each needle of the first plurality or second plurality of needles is rigidly connected to at least one first or second block, respectively, the needles of said first or second block being substantially parallel to one another, and said first or second block being slideably movable towards the preform in parallel with a direction of the needles by a corresponding actuator in the corresponding first or second mould portion.

2. The set according to claim 1, wherein each of the first and second mould portions of the mould has a first plurality and a second plurality of needles, respectively, which are capable of extending from said first and second recesses, respectively, with respect to the whole of the first and second surfaces, in order to penetrate at least the weave of the first and second surfaces.

3. The set according to claim 2, wherein the needles of the first plurality of needles are not arranged to face the needles of the second plurality of needles.

4. The set according to claim 1, wherein each first or second mould portion receives at least two first or two second blocks, respectively, which are fitted slideably in the first or second mould portion, respectively, along different strokes, the stroke of each first or second block being configured to allow the needles to penetrate at least a corresponding region, of predetermined thickness, of the weave of the preform with respect to the corresponding first or second surface, respectively.

5. The set according to claim 1, wherein the needles of each first or second block are supplied with resin according to a flow rate, pressure and injection duration configured to fill the predetermined thickness of the weave of the preform with respect to the corresponding first or second surface.

6. A method for manufacturing a turbine engine part, made of composite material, using the set according to claim 1, comprising successively:
   a step (ET1) of producing the preform of the set, made of composite material, by weaving fibres;
   a step (ET2) of placing the preform in a first or second recess formed in a first or second portion of the mould, respectively;
   a step of attaching the second portion of the mould, or the first portion of the mould, to the first portion of the mould, or the second portion of the mould, respectively;
   a step of insertion during which the plurality of needles of the injection means penetrates at least the weave of the preform;
   a step of closing the mould, consisting in attaching the second portion of the mould, or the first portion of the mould, to the first portion of the mould, or the second portion of the mould, respectively, at the end of which step the needles of the plurality of needles of the injection means occupy their extended position;
   a step of vacuum-injecting resin, during which the resin is injected at least into the weave of the preform by means of the needles and during which, as the injection progresses, the needles are retracted from their extended position towards their retracted position;
   a step of polymerising the resin, during which the resin is kept under pressure in the mould;
   a step of taking out the polymerised part.

7. A method for manufacturing a turbine engine part, made of composite material, using the set according to claim 4, comprising successively:
   a step of producing a preform, made of composite materials, by weaving fibres, said preform having, with respect to each of its first or second surfaces, predetermined regions of different thicknesses;

a step of placing the preform in a first or second recess formed in a first or second portion of the mould, respectively;

a step of attaching the second portion of the mould, or the first portion of the mould, to the first portion of the mould, or the second portion of the mould, respectively;

a step of insertion during which the first blocks of the first mould portion and the second blocks of the second mould portion are moved independently of one another by means of their respective actuators such that the needles of the pluralities of needles of said first blocks and second blocks penetrate at least the thicknesses of each region of the weave of the preform;

a step of closing the mould, consisting in attaching the second portion of the mould, or the first portion of the mould, to the first portion of the mould, or the second portion of the mould, respectively, and at the end of which step the needles of the pluralities of needles of the first and second blocks occupy their extended position;

a step of vacuum-injecting resin, during which the resin is injected at least into the weave of the preform by means of the needles and during which, simultaneously, the first and second blocks are moved by means of their actuators such that their needles are retracted from their extended position towards their retracted position;

a step of polymerising the resin, during which the resin is kept under pressure in the mould;

a step of taking out the polymerised part.

8. The manufacturing method according to claim 6, comprising, prior to the step of placing the preform, a step of selecting needles during which the diameter of each needle is determined on the basis of a viscosity of the resin to be injected and a flow rate of the resin to be injected, and by the space between two strands of the weave of the preform, said diameter being configured to be less than said space between two strands.

9. The set according to claim 1, wherein the diameter of the tubular needles is set depending on the density of the weave of the preform, defined by the space between two consecutive strands of the weave of this preform, the diameter of the tubular needles being set so as to allow the weave to be penetrated between two strands without this leading the strands being torn.

* * * * *